(12) United States Patent
Kawauchi et al.

(10) Patent No.: US 11,994,600 B2
(45) Date of Patent: May 28, 2024

(54) RECEPTION APPARATUS AND RECEPTION METHOD

(71) Applicant: SONY SEMICONDUCTOR SOLUTIONS CORPORATION, Kanagawa (JP)

(72) Inventors: Hidetoshi Kawauchi, Kanagawa (JP); Toru Katsumoto, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 305 days.

(21) Appl. No.: 17/289,048

(22) PCT Filed: Sep. 30, 2019

(86) PCT No.: PCT/JP2019/038553
§ 371 (c)(1),
(2) Date: Apr. 27, 2021

(87) PCT Pub. No.: WO2020/095574
PCT Pub. Date: May 14, 2020

(65) Prior Publication Data
US 2021/0405214 A1    Dec. 30, 2021

(30) Foreign Application Priority Data

Nov. 7, 2018   (JP) ................................ 2018-209591

(51) Int. Cl.
*G01S 19/45* (2010.01)
*G01S 19/03* (2010.01)
(Continued)

(52) U.S. Cl.
CPC .............. *G01S 19/45* (2013.01); *G01S 19/03* (2013.01); *G01S 19/22* (2013.01); *G01S 19/396* (2019.08); *G06F 1/163* (2013.01)

(58) Field of Classification Search
CPC .......... G01S 19/03; G01S 19/05; G01S 19/06; G01S 19/22; G01S 19/252; G01S 19/396; G01S 19/45; G01C 21/28
See application file for complete search history.

(56) References Cited

U.S. PATENT DOCUMENTS

2002/0098849 A1*  7/2002  Bloebaum ............... G01S 19/25
                                                    455/507
2009/0195350 A1*  8/2009  Tsern ....................  G06F 1/1632
                                                    340/3.1
(Continued)

FOREIGN PATENT DOCUMENTS

CN    101855518 A    10/2010
CN    103033822 A     4/2013
(Continued)

OTHER PUBLICATIONS

E.D. Kaplan et al., Understanding GPS: Principles and Applications, Second Edition, Artech House, p. 54-58 (Year: 2006).*
(Continued)

*Primary Examiner* — Bernarr E Gregory
*Assistant Examiner* — Fred H Mull
(74) *Attorney, Agent, or Firm* — CHIP LAW GROUP

(57) ABSTRACT

Provided are a reception apparatus and a reception method that are capable of acquiring altitude information by a method suitable for a wearable device and improving position calculation accuracy. The reception apparatus includes an altitude information acquisition unit and a positioning calculation unit. The altitude information acquisition unit acquires altitude information externally calculated via proximity wireless communication. The positioning calculation unit performs positioning computation on the basis of a
(Continued)

received global navigation satellite system (GNSS) signal and the altitude information supplied from the altitude information acquisition unit.

7 Claims, 14 Drawing Sheets

(51) Int. Cl.
*G01S 19/22* (2010.01)
*G01S 19/39* (2010.01)
*G06F 1/16* (2006.01)

(56) References Cited

U.S. PATENT DOCUMENTS

| | | | | |
|---|---|---|---|---|
| 2010/0286912 | A1* | 11/2010 | Inoue | G01S 19/48 |
| | | | | 701/470 |
| 2012/0182180 | A1* | 7/2012 | Wolf | G01S 5/14 |
| | | | | 342/357.29 |
| 2013/0082873 | A1 | 4/2013 | Tang et al. | |
| 2016/0124069 | A1* | 5/2016 | Sendonaris | G01S 19/50 |
| | | | | 342/462 |
| 2020/0150279 | A1* | 5/2020 | Miyajima | G01S 19/49 |

FOREIGN PATENT DOCUMENTS

| | | | | |
|---|---|---|---|---|
| EP | 2574962 | A2 | 4/2013 | |
| EP | 2682714 | A2 * | 1/2014 | ............ G01C 17/00 |
| JP | 06-265622 | A | 3/1990 | |
| JP | H06265622 | A * | 9/1994 | |
| JP | 2008-249715 | A | 10/2008 | |
| JP | 2009-121885 | A | 6/2009 | |
| JP | 2012-042475 | A | 3/2012 | |
| JP | 2013-079959 | A | 5/2013 | |
| JP | 2018-009961 | A | 1/2018 | |
| JP | 2018009961 | A * | 1/2018 | |
| KR | 10-2013-0036145 | A | 4/2013 | |
| WO | 2009/063946 | A1 | 5/2009 | |

OTHER PUBLICATIONS

N. Viandier et al., GNSS accuracy analysis along an urban bus line for ADAS application (abstract only), ENC-GNSS 2008—European Navigation Conference (Year: 2008).*

International Search Report and Written Opinion of PCT Application No. PCT/JP2019/038553, dated Dec. 24, 2019, 10 pages of ISRWO.

* cited by examiner

F.I.G.4

RECEPTION APPARATUS AND RECEPTION METHOD

CROSS REFERENCE TO RELATED APPLICATIONS

This application is a U.S. National Phase of International Patent Application No. PCT/JP2019/038553 filed on Sep. 30, 2019, which claims priority benefit of Japanese Patent Application No. JP 2018-209591 filed in the Japan Patent Office on Nov. 7, 2018. Each of the above-referenced applications is hereby incorporated herein by reference in its entirety.

TECHNICAL FIELD

The present technology relates to a reception apparatus, a program, and a reception method that are associated with GNSS positioning.

BACKGROUND ART

Satellite positioning systems represented by the U.S. global positioning system (GPS) are now widely spread to car navigations, smart phones, etc., and location information is becoming more indispensable in everyday life.

In addition to the U.S. GPS, unique satellite positioning systems such as the Japanese quasi-zenith satellite system (QZSS), the Russian global navigation satellite system (GLONASS), the Chinese BeiDou, and the European Galileo have been standardized and operated worldwide. These satellite positioning systems are collectively called global navigation satellite system (GNSS).

In particular, in recent years, there has been a movement to add the GNSS to wearable devices typified by smart watches and sports watches. In such wearable devices, a reception status of a GNSS signal may deteriorate due to a mounting position of the device, a user's posture, or the like in addition to a small antenna employed therein.

The deterioration of the reception status mentioned here refers to the fact that satellites are blocked by human bodies or buildings and the blocked satellites cannot be observed, thus causing an arrangement deviation of satellites available for positioning or failing to find four satellites available for positioning.

In addition, a situation in which the satellite on the blocked side cannot be directly observed causes another situation in which only the signal reflected from the buildings or the like is received. When such a situation occurs, in a case where the number of satellites used for positioning is less than four, a location cannot be determined by positioning.

Further, when there is an arrangement deviation of satellites or when a reflected signal is received, an error of a location obtained by positioning becomes large even when there is a sufficient number of satellites.

To cope with such a problem, there has been known a means for calculating, among unknown parameters to be obtained by positioning computation, one or a plurality of parameters by a different method, and applying the result obtained to reduce unknown parameters and improve calculation accuracy.

Especially, it is generally known that the error in an altitude direction becomes larger as compared with the error in a horizontal direction in the positioning using the GNSS, and the technology of utilizing information obtained by calculating an altitude by another method is examined. For example, Patent Literature 1 discloses the technology of acquiring altitude information of a receiver using a cellular network.

CITATION LIST

Patent Literature

Patent Literature 1: Japanese Patent Application Laid-open No. 2012-42475

DISCLOSURE OF INVENTION

Technical Problem

However, in the technology described in the cited document 1, it is necessary for the receiver to have a cellular communication function, and there are many examples in which the receiver is not mounted in a wearable device. In addition, although there is a technology in which a server manages altitude information, it is necessary to create a database of local altitude information beforehand, and data is not necessarily present at the place where the receiver is used in some cases.

In view of the circumstances as described above, it is an object of the present technology to provide a reception apparatus, a program, and a reception method that are capable of acquiring altitude information by a method suitable for a wearable device and improving position calculation accuracy.

Solution to Problem

In order to achieve the above object, a reception apparatus according to the present technology includes an altitude information acquisition unit and a positioning calculation unit.

The altitude information acquisition unit acquires altitude information externally calculated via proximity wireless communication.

The positioning calculation unit performs positioning computation on the basis of a received global navigation satellite system (GNSS) signal and the altitude information supplied from the altitude information acquisition unit.

According to this configuration, the reception apparatus performs positioning computation on the basis of the altitude information acquired via the proximity wireless communication and the received GNSS signal. The reception apparatus is capable of performing positioning computation using the altitude information externally calculated and performing accurate positioning, even when a reception environment for the GNSS signal is not good.

The altitude information acquisition unit may acquire, from another reception apparatus having a GNSS positioning function and a proximity wireless communication function, altitude information calculated in the other reception apparatus.

The altitude information acquisition unit may acquire, from a plurality of other reception apparatuses, pieces of altitude information calculated in the plurality of other reception apparatuses.

The altitude information acquisition unit may supply a median value of altitudes calculated in the plurality of other reception apparatuses to the positioning calculation unit.

The altitude information acquisition unit may supply a mean value of altitudes calculated in the plurality of other reception apparatuses to the positioning calculation unit.

The altitude information acquisition unit may further acquire altitude reliability information indicating reliability of an altitude via the proximity wireless communication and select the altitude information to be supplied to the positioning calculation unit on the basis of the altitude reliability information.

The altitude reliability information may be information indicating a satellite signal arrangement.

The altitude reliability information may be information indicating a GNSS signal level determined from signal power and noise power of the GNSS signal.

The positioning calculation unit may perform, when satellites that have received the GNSS signal are four or more, positioning computation on the basis of the received GNSS signal and perform, when the satellites that have received the GNSS signal are three or less, positioning computation on the basis of the received GNSS signal and the altitude information supplied from the altitude information acquisition unit.

The positioning calculation unit may perform, when the reception apparatus is not in a multipath environment, positioning computation on the basis of the received GNSS signal and perform, when the reception apparatus is in the multipath environment, positioning computation on the basis of the received GNSS signal and the altitude information supplied from the altitude information acquisition unit.

In order to achieve the above object, a program according to the present technology causes an information processing apparatus to function as an altitude information acquisition unit and a positioning calculation unit.

The altitude information acquisition unit acquires altitude information externally calculated via proximity wireless communication.

The positioning calculation unit performs positioning computation on the basis of a received global navigation satellite system (GNSS) signal and the altitude information supplied from the altitude information acquisition unit.

In order to achieve the above object, a reception method according to the present technology includes: acquiring, by an altitude information acquisition unit, altitude information externally calculated via proximity wireless communication; and performing, by a positioning calculation unit, positioning computation on the basis of a received global navigation satellite system (GNSS) signal and the altitude information supplied from the altitude information acquisition unit.

MODE(S) FOR CARRYING OUT THE INVENTION

First Embodiment

A positioning system according to a first embodiment of the present technology will be described.

[Configuration of Positioning System]

Figure 1:
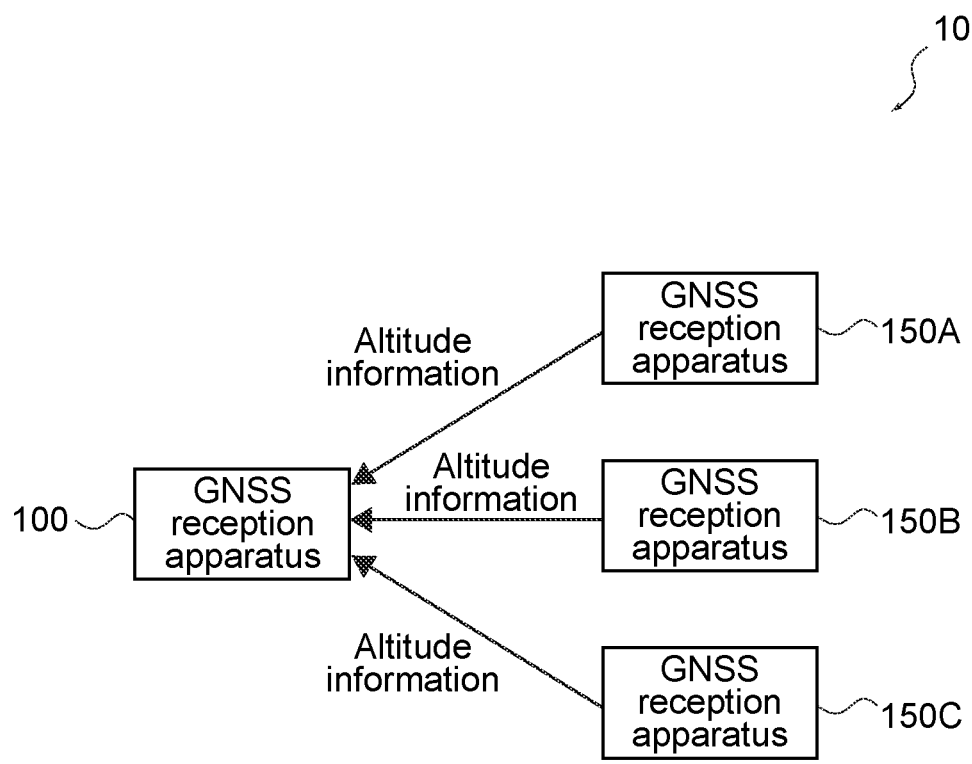
FIG. 1 is a schematic diagram of a positioning system according to a first embodiment of the present technology.

FIG. 1 is a schematic diagram showing a configuration of a positioning system 10 according to this embodiment. As shown in the figure, the positioning system 10 includes a plurality of GNSS reception apparatuses. The GNSS reception apparatus is an apparatus capable of receiving global navigation satellite system (GNSS) signals and performing positioning based on the GNSS signals.

In this embodiment, the positioning system 10 is assumed to include four GNSS reception apparatuses, but the number of GNSS reception apparatuses is not limited to four and it may be two or more.

As shown in FIG. 1, in the positioning system 10, one GNSS reception apparatus is a GNSS reception apparatus 100, and the other GNSS reception apparatuses are a GNSS reception apparatus 150A, a GNSS reception apparatus 150B, and a GNSS reception apparatus 150C. In addition, the GNSS reception apparatus 150A, the GNSS reception apparatus 150B, and the GNSS reception apparatus 150C are collectively referred to as GNSS reception apparatuses 150A to 150C.

Each GNSS reception apparatus is not particularly limited as long as it is an apparatus capable of GNSS positioning, but a wearable information processing apparatus is suitable.

The GNSS reception apparatuses are capable of communicating with each other via proximity wireless communication such as Bluetooth (registered trademark), and the GNSS reception apparatus 100 acquires pieces of altitude information from the GNSS reception apparatuses 150A to 150C. This will be described in detail later.

[Configuration of Other GNSS Reception Apparatuses]

First, the configuration of the GNSS reception apparatus 150 to be used as the GNSS reception apparatuses 150A to 150C will be described.

Figure 2:
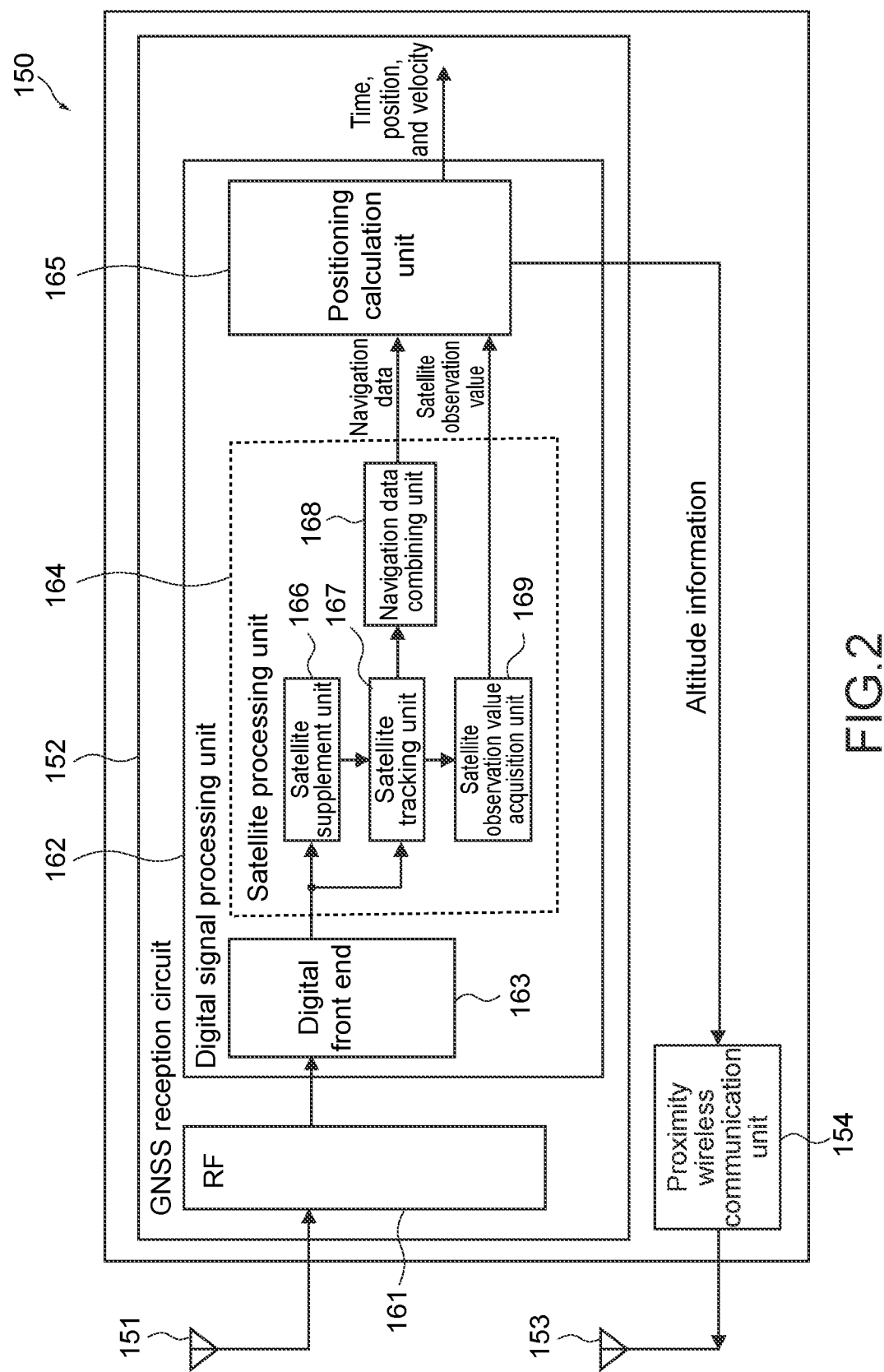
FIG. 2 is a block diagram showing a configuration of another GNSS reception apparatus of the positioning system.

FIG. 2 is a block diagram showing the configuration of the GNSS reception apparatus 150. As shown in the figure, the GNSS reception apparatus 150 includes a GNSS antenna 151, a GNSS reception circuit 152, a proximity wireless antenna 153, and a proximity wireless communication unit 154.

The GNSS antenna 151 is an antenna for receiving a GNSS signal and only needs to have a configuration capable of receiving the GNSS signal.

The GNSS reception circuit 152 is a circuit for processing the GNSS signal received by the GNSS antenna 151. The GNSS reception circuit 152 includes a radio frequency (RF) unit 161 and a digital signal processing unit 162.

The RF unit 161 converts the GNSS signal into an intermediate frequency (IF) signal and further into a digital signal and supplies the digital signal to the digital signal processing unit 162.

The digital signal processing unit 162 includes a digital front end 163, a satellite processing unit 164, and a positioning calculation unit 165.

The digital front end 163 converts the digital signal supplied from the RF unit 161 into a baseband signal and supplies the baseband signal to the satellite processing unit 164.

The satellite processing unit 164 includes a satellite supplement unit 166, a satellite tracking unit 167, a navigation data combining unit 168, and a satellite observation value acquisition unit 169.

The satellite supplement unit 166 detects a GNSS satellite on the basis of a satellite-specific code sequence and a consultation detection for the baseband signal supplied from the digital front end 163.

The satellite tracking unit 167 performs, for the detected GNSS satellite, code timing synchronization, carrier synchronization, bit synchronization for navigation data, and preamble synchronization and supplies the baseband signal processed for synchronization to the navigation data combining unit 168.

The navigation data combining unit 168 combines the baseband signals processed for synchronization to obtain navigation data, and supplies it to the positioning calculation unit 165.

The satellite observation value acquisition unit 169 acquires a satellite observation value necessary for positioning calculation from the baseband signal and supplies the satellite observation value to the positioning calculation unit 165.

The positioning calculation unit 165 performs positioning calculation from the navigation data and the satellite observation value and calculates the time, position, and velocity of the GNSS reception apparatus 150 as will be described later. This positioning calculation can be performed by a general calculation method. The positioning calculation unit 165 supplies "altitude information" indicating the altitude of the GNSS reception apparatus 150 to the proximity wireless communication unit 154.

The proximity wireless antenna 153 is an antenna capable of communicating with the GNSS reception apparatus 100 via proximity wireless communication. The type of the proximity wireless communication may be, for example, Bluetooth (registered trademark), but it is not particularly limited as long as it is capable of communicating with the GNSS reception apparatus 100.

The proximity wireless communication unit 154 transmits the altitude information supplied from the positioning calculation unit 165 to the GNSS reception apparatus 100 via the proximity wireless antenna 153.

Each of the GNSS reception apparatuses 150A to 150C has the above-mentioned configuration and transmits the altitude information indicating the altitude thereof to the GNSS reception apparatus 100.

[Regarding Positioning Calculation Unit]

Figure 3:
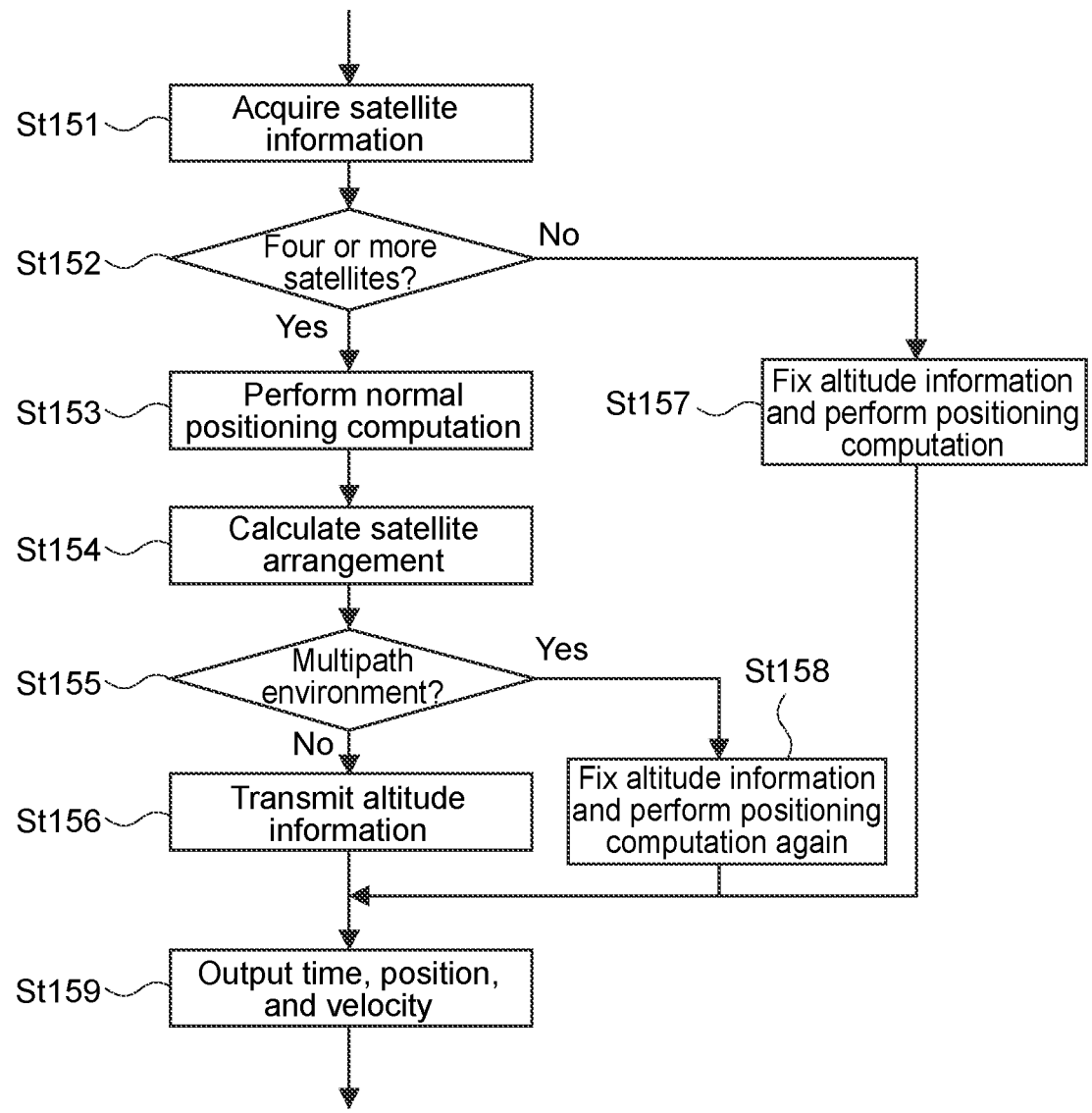
FIG. 3 is a flowchart showing the operation of a positioning calculation unit of the GNSS reception apparatus.

The positioning calculation unit 165 performs positioning calculation on the basis of the GNSS signal received by the GNSS antenna 151. FIG. 3 is a flowchart showing the operation of the positioning calculation unit 165.

The positioning calculation unit 165 acquires satellite information (St151) and then determines whether GNSS satellites that have received the GNSS signal are four or more satellites (St152). The satellite information includes reception satellites, pseudoranges, Doppler frequencies, carrier phases, signal intensities, etc.

If GNSS satellites that have received the GNSS signal are four or more satellites (St152: Yes), the positioning calculation unit 165 performs positioning computation by a normal method (St153) and calculates the position (including the altitude), time, and velocity of the GNSS reception apparatus 150. Subsequently, the positioning calculation unit 165 calculates a satellite arrangement (St154).

Further, the positioning calculation unit 165 determines whether the GNSS reception apparatus 150 is in a multipath environment or not (St155). The multipath environment is an environment in which the GNSS signal is reflected from buildings, mountains, etc., and reaches the GNSS antenna 151 by a plurality of paths.

If the GNSS reception apparatus 150 is not in the multipath environment (St155: No), the positioning calculation unit 165 supplies the altitude information indicating the altitude of the GNSS reception apparatus 150 to the proximity wireless communication unit 154, and the proximity wireless communication unit 154 transmits the altitude information to the GNSS reception apparatus 100 via the proximity wireless antenna 153 (St156).

On the other hand, if GNSS satellites that have received the GNSS signal are three or less satellites (St152: No), the number of GNSS satellites is insufficient to calculate the altitude information of the GNSS reception apparatus 150, and thus the positioning calculation unit 165 performs positioning computation by fixing the altitude information (St157). Note that, in the normal GNSS positioning, the equations having four unknowns (x, y, and z representing position, and time) are solved using the positions of the four satellites. If GNSS satellites that have received the GNSS signal are equal to or less than three satellites, (x, y, z) representing a position is fixed with the altitude (z) as being known, and the unknowns are reduced to two unknowns to solve the equations.

In addition, if the GNSS reception apparatus 150 is in the multipath environment (St155: Yes), the positioning calculation unit 165 performs positioning computation again by fixing the altitude information (St158).

The positioning calculation unit 165 outputs the calculated time, position, and velocity of the GNSS reception apparatus 150 (St159). The positioning calculation unit 165 performs the operation as described above.

As described above, in a case where a reception environment of the GNSS signal is good, that is, in a case where the number of satellites that have received the GNSS signal is four or more, or where the GNSS reception apparatus 150 is not in the multipath environment, the GNSS reception apparatus 150 transmits its own altitude information calculated by the positioning computation to the GNSS reception apparatus 100.

[Configuration of GNSS Reception Apparatus]

Next, a configuration of the GNSS reception apparatus 100 will be described.

Figure 4:
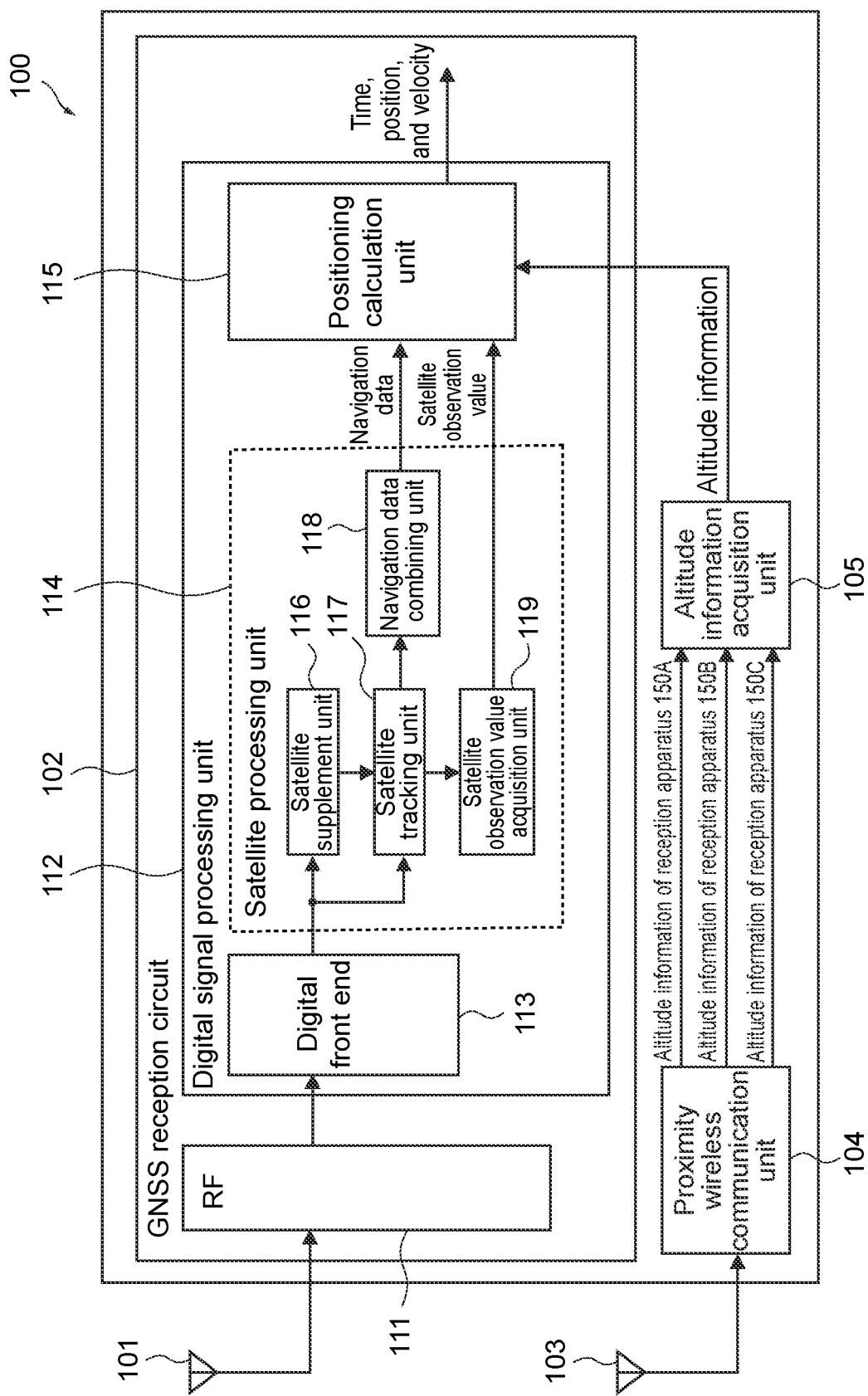
FIG. 4 is a block diagram showing a configuration of a GNSS reception apparatus of the positioning system according to the first embodiment of the present technology.

FIG. 4 is a schematic diagram showing the configuration of the GNSS reception apparatus 100. As shown in the figure, the GNSS reception apparatus 100 includes a GNSS antenna 101, a GNSS reception circuit 102, a proximity wireless antenna 103, a proximity wireless communication unit 104, and an altitude information acquisition unit 105.

The GNSS antenna 101 is an antenna for receiving a GNSS signal and only needs to have a configuration capable of receiving the GNSS signal.

The GNSS reception circuit 102 is a circuit for processing the GNSS signal received by the GNSS antenna 101. The GNSS reception circuit 102 includes a radio frequency (RF) unit 111 and a digital signal processing unit 112.

The RF unit 111 converts the GNSS signal into an intermediate frequency (IF) signal and further into a digital signal and supplies the digital signal to the digital signal processing unit 112.

The digital signal processing unit 112 includes a digital front end 113, a satellite processing unit 114, and a positioning calculation unit 115.

The digital front end 113 converts the digital signal supplied from the RF unit 111 into a baseband signal and supplies the baseband signal to the satellite processing unit 114.

The satellite processing unit 114 includes a satellite supplement unit 116, a satellite tracking unit 117, a navigation data combining unit 118, and a satellite observation value acquisition unit 119.

The satellite supplement unit 116 detects a GNSS satellite on the basis of a satellite-specific code sequence and a consultation detection for the baseband signal supplied from the digital front end 113.

The satellite tracking unit 117 performs, for the detected GNSS satellite, code timing synchronization, carrier synchronization, bit synchronization for navigation data, and preamble synchronization and supplies the baseband signal processed for synchronization to the navigation data combining unit 118.

The navigation data combining unit 118 combines the baseband signals processed for synchronization to obtain navigation data and supplies it to the positioning calculation unit 115.

The satellite observation value acquisition unit 119 acquires a satellite observation value necessary for positioning calculation from the baseband signal and supplies the satellite observation value to the positioning calculation unit 115.

The positioning calculation unit 115 performs positioning calculation from the navigation data and the satellite observation value. Here, the positioning calculation unit 115 according to this embodiment further uses pieces of altitude information acquired from the GNSS reception apparatuses 150A to 150C for the positioning calculation. This will be described in detail later.

The proximity wireless antenna 103 is an antenna capable of communicating with the GNSS reception apparatuses 150A to 150C via proximity wireless communication. The type of the proximity wireless communication may be, for example, Bluetooth (registered trademark), but it is not particularly limited as long as it is capable of communicating with the GNSS reception apparatuses 150A to 150C.

The proximity wireless communication unit 104 receives the pieces of altitude information supplied from the respective GNSS reception apparatuses 150A to 150C via the proximity wireless antenna 103 and supplies the pieces of altitude information to the altitude information acquisition unit 105.

The altitude information acquisition unit 105 determines the altitude of the GNSS reception apparatus 100 from the pieces of altitude information of the respective GNSS reception apparatuses 150A to 150C and supplies the altitude information to the positioning calculation unit 115.

[Regarding Altitude Information Acquisition Unit]

Figure 5:
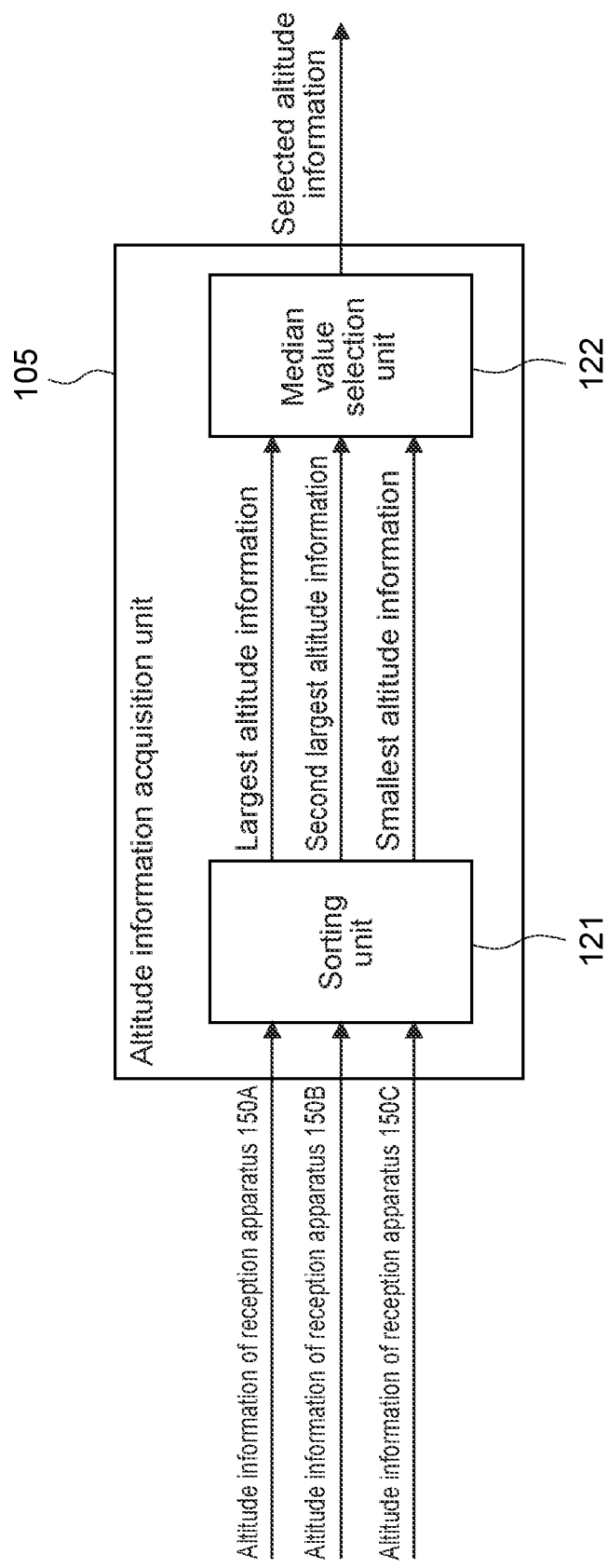
FIG. 5 is a block diagram showing a configuration of an altitude information acquisition unit of the GNSS reception apparatus.

FIG. 5 is a block diagram showing a configuration of the altitude information acquisition unit 105. As shown in the figure, the altitude information acquisition unit 105 includes a sorting unit 121 and a median value selection unit 122.

The sorting unit 121 sorts the pieces of altitude information of the respective GNSS reception apparatuses 150A to 150C, which are supplied from the proximity wireless communication unit 104, in descending order of altitude and supplies the resultant information to the median value selection unit 122.

The median value selection unit 122 selects a median value of the altitudes of the respective GNSS reception apparatuses 150A to 150C and supplies the altitude information of the selected altitude to the positioning calculation unit 115.

Note that the case where the proximity wireless communication unit 104 receives the pieces of altitude information from the respective GNSS reception apparatuses 150A to 150C is shown here, but as described above, the pieces of altitude information may be received from part of the GNSS reception apparatuses 150A to 150C or may be received from a larger number of GNSS reception apparatuses 150. Also in these cases, the median value selection unit 122 selects the median value of the pieces of altitude information received. In addition, when the altitude information is received from only one GNSS reception apparatus 150, the median value selection unit 122 selects that altitude information.

[Regarding Positioning Calculation Unit]

The positioning calculation unit 115 performs positioning calculation on the basis of the GNSS signal received by the GNSS antenna 101 and the altitude information supplied from the altitude information acquisition unit 105.

Figure 6:
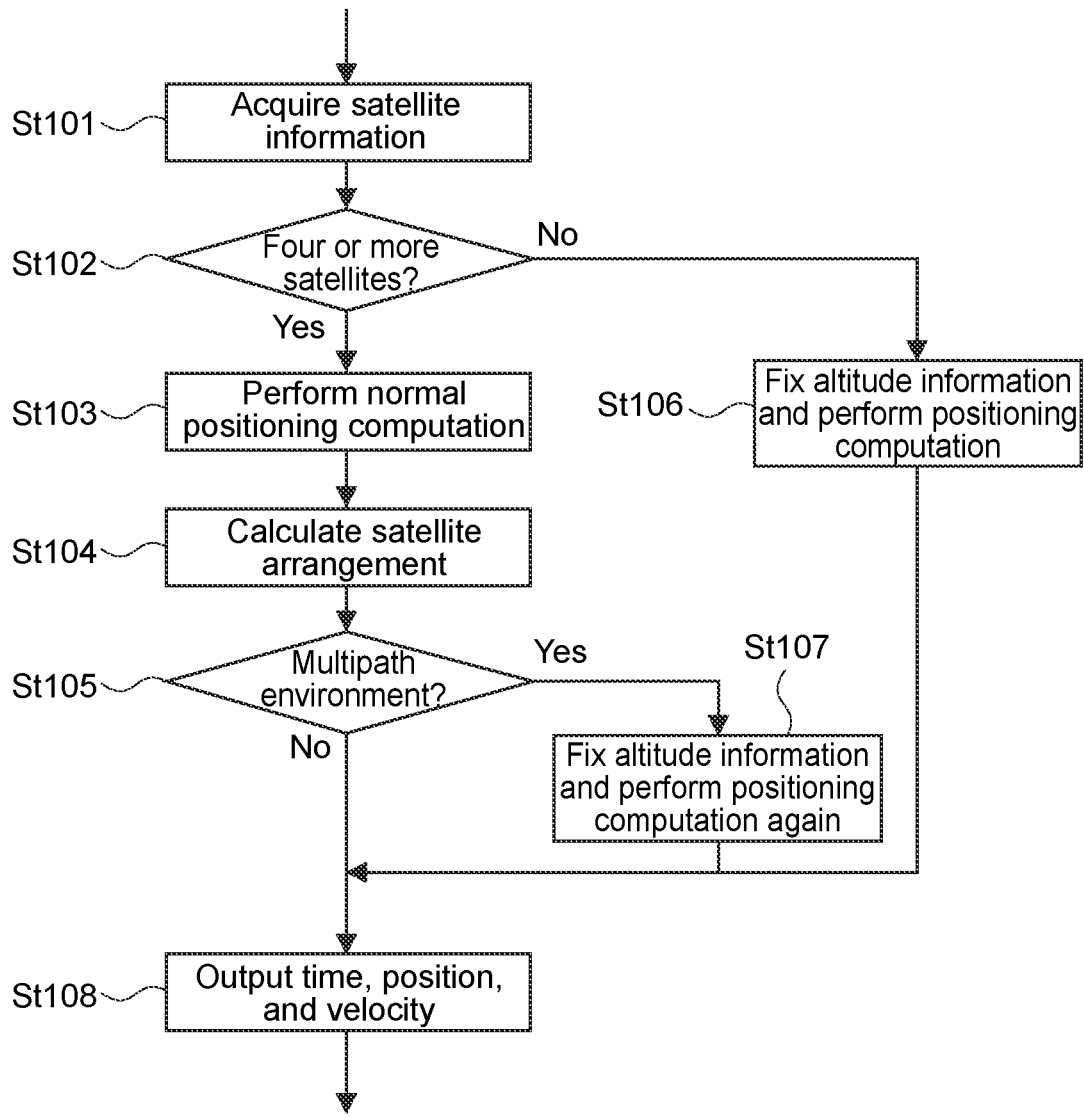
FIG. 6 is a flowchart showing the operation of a positioning calculation unit of the GNSS reception apparatus.

FIG. 6 is a flowchart showing the operation of the positioning calculation unit 115.

The positioning calculation unit 115 acquires satellite information (St101) and then determines whether GNSS satellites that have received the GNSS signal are four or more satellites (St102). The satellite information includes reception satellites, pseudoranges, Doppler frequencies, carrier phases, signal intensities, etc.

If GNSS satellites that have received the GNSS signal are four or more satellites (St102: Yes), the positioning calculation unit 115 performs positioning computation by a normal method (St103) and calculates the position, time, and velocity of the GNSS reception apparatus 150. Subsequently, the positioning calculation unit 115 calculates a satellite arrangement (St104).

Further, the positioning calculation unit 115 determines whether the GNSS reception apparatus 150 is in a multipath environment or not (St105).

If the GNSS reception apparatus 100 is not in the multipath environment (St105: No), the positioning calculation unit 115 sets the time, position, and velocity calculated in the positioning computation (St103) as the time, position, and velocity of the GNSS reception apparatus 100.

On the other hand, if GNSS satellites that have received the GNSS signal are three or less satellites (St102: No), the positioning calculation unit 115 performs positioning computation by fixing the altitude information supplied from the altitude information acquisition unit 105 as its own altitude information (St106).

In addition, if the GNSS reception apparatus 150 is in the multipath environment (St105: Yes), the positioning calculation unit 115 performs positioning computation again by fixing the altitude information supplied from the altitude information acquisition unit 105 as its own altitude information (St107).

The positioning calculation unit 115 outputs the calculated time, position, and velocity of the GNSS reception apparatus 100 (St108).

The positioning calculation unit 115 performs the operation as described above. In a case where a reception environment of the GNSS signal is good, that is, in a case where the number of satellites that have received the GNSS signal is four or more, or where the GNSS reception apparatus 100 is not in the multipath environment, the positioning calculation unit 115 calculates the time, the position, and the velocity on the basis of the GNSS signal.

On the other hand, in a case where the reception environment is not good, that is, in a case where the number of satellites that have received the GNSS signal is three or less, or where the GNSS reception apparatus 100 is in the multipath environment, the positioning calculation unit 115 calculates the time, the position, and the velocity on the basis of the altitude information supplied by the altitude information acquisition unit 105 in addition to the received GNSS signal.

The altitude information supplied by the altitude information acquisition unit 105 are the pieces of altitude information of the GNSS reception apparatuses 150A to 150C, which are received from the GNSS reception apparatuses 150A to 150C via proximity wireless communication. The altitudes of the GNSS reception apparatuses 150A to 150C present in the neighborhood of the GNSS reception apparatus 100, i.e., within the communication range of the proximity wireless communication can be considered to be equivalent to the altitude of the GNSS reception apparatus 100.

As described above, in a case where the reception environment of the GNSS signal is not good, the positioning calculation unit 115 calculates its own time, position, and velocity using the altitude information of the GNSS reception apparatus 150 located in the neighborhood. As a result, even in a case where the reception environment of the GNSS signal is not good, the GNSS reception apparatus 100 is capable of calculating its own time, position and velocity with high accuracy.

In particular, if the GNSS reception apparatus 100 is a wearable terminal, the reception environment of the GNSS signal of the wearable terminal greatly varies depending on the position and posture of the wearable terminal itself, the positional relationship with the user who wears the wearable terminal, and the like. Therefore, when a plurality of GNSS reception apparatuses 150 is present in the neighborhood, there is a large possibility that there is a GNSS reception apparatus 150 having a better reception environment than the GNSS reception apparatus 100. Therefore, the GNSS reception apparatus 100 can prevent the effect due to variations in the reception environment by utilizing the altitude information of the GNSS reception apparatus 150.

In addition, as described above, in the positioning system 10, the GNSS reception apparatus 100 only needs to be capable of receiving the pieces of altitude information from the GNSS reception apparatuses 150A to 150C, and the positioning system 10 does not require an external database or cellular network. Therefore, the positioning system 10 is available in any region as long as the GNSS signal can be received.

[Regarding Other Configurations of Altitude Information Acquisition Unit]

Figure 7:
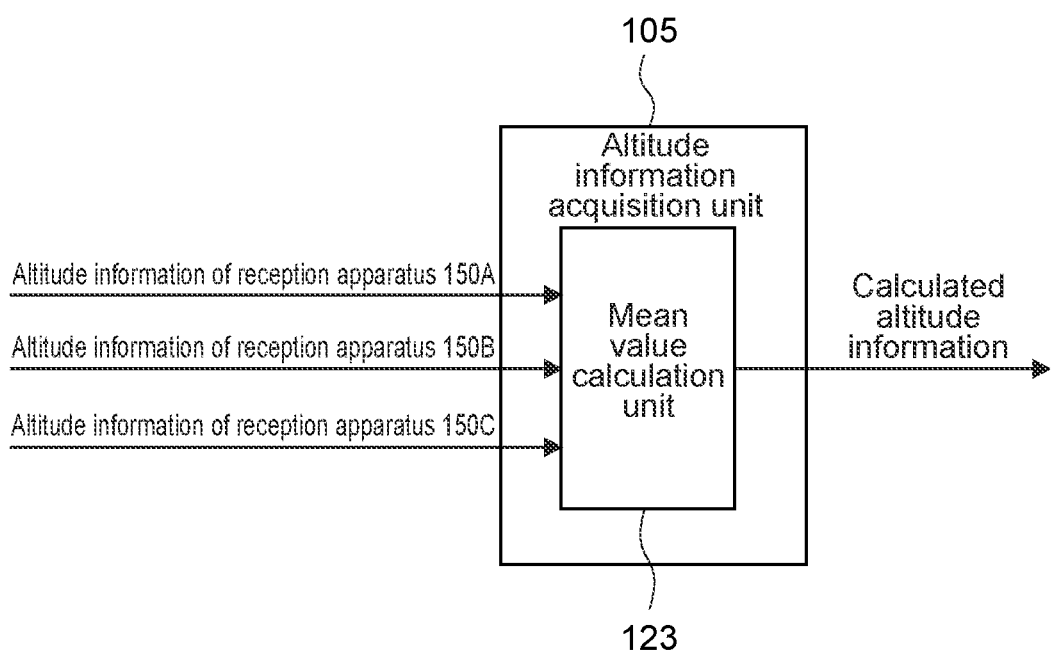
FIG. 7 is a block diagram showing another configuration of the altitude information acquisition unit of the GNSS reception apparatus.

The configuration of the altitude information acquisition unit 105 is not limited to that described above. FIG. 7 is a block diagram showing another configuration of the altitude information acquisition unit 105. As shown in the figure, the altitude information acquisition unit 105 includes a mean value calculation unit 123.

The mean value calculation unit 123 calculates a mean value of the altitudes for the pieces of altitude information of the GNSS reception apparatuses 150A to 150C, which are supplied from the proximity wireless communication unit 104, and supplies the calculated altitude information of the altitudes to the positioning calculation unit 115.

As described above, the altitude information acquisition unit 105 is also capable of calculating the mean value and supplying the mean value to the positioning calculation unit 115 instead of the median value of the altitudes of the GNSS reception apparatuses 150A to 150C.

Note that the GNSS reception apparatus 150 may have the same configuration as that of the GNSS reception apparatus 100, i.e., each of them may have the altitude information acquisition unit.

[Regarding Hardware Configuration]

At least a part of the functional configuration of the GNSS reception apparatus 100 can also be provided by cooperation of hardware and programs to be described below.

Figure 8:
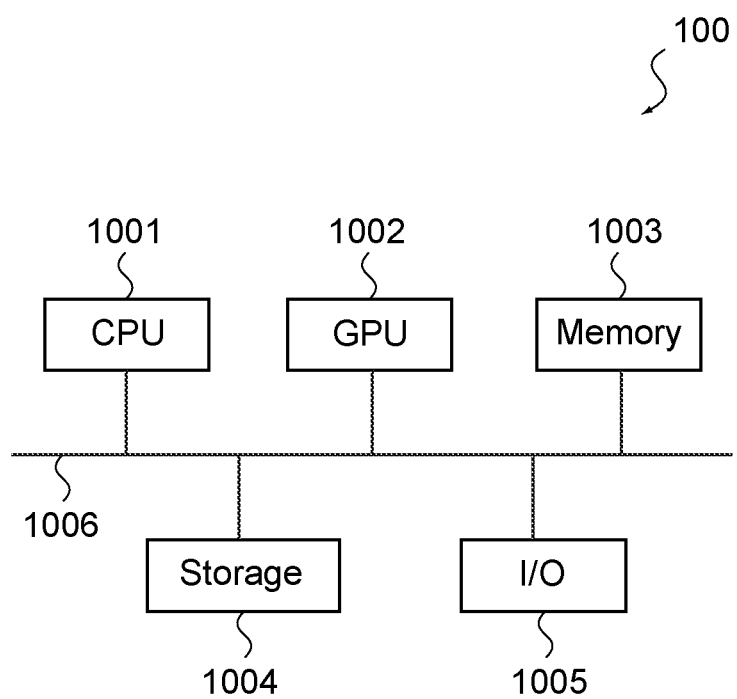
FIG. 8 is a block diagram showing a hardware configuration of the GNSS reception apparatus.

FIG. 8 is a diagram schematically showing a hardware configuration of the GNSS reception apparatus 100. As shown in the figure, the GNSS reception apparatus 100 includes a central processing unit (CPU) 1001, a graphic processing unit (GPU) 1002, a memory 1003, a storage 1004, and an input/output unit (I/O) 1005 as the hardware configuration. These are connected to each other by a bus 1006.

The CPU 1001 controls the other structural elements according to a program stored in the memory 1003, performs data processing according to the program, and stores a processing result in the memory 1003. The CPU 1001 may be a microprocessor.

The GPU 1002 performs image processing under the control of the CPU 1001. The GPU 1002 may be a microprocessor.

The memory 1003 stores a program and data executed by the CPU 1001. The memory 1003 may be a random access memory (RAM).

The storage 1004 stores a program and data. The storage 1004 may be a hard disk drive (HDD) or a solid state drive (SSD).

The input/output unit 1005 receives an input to the GNSS reception apparatus 100 and also supplies an output of the GNSS reception apparatus 100 to the outside. The input/output unit 1005 includes an input device such as a touch panel, an output device such as a display, and a connection interface such as a network.

For example, the GNSS reception circuit 102 and the proximity wireless communication unit 104 described above may be provided by modules independent of the CPU 1001 and may be connected to the input/output unit 1005. In addition, the positioning calculation unit 115 and the altitude information acquisition unit 105 may be provided by cooperation of the CPU 1001 and programs.

The hardware configuration of the GNSS reception apparatus 100 is not limited to that described above, and may be any hardware configuration as long as it can provide a functional configuration of the GNSS reception apparatus 100. In addition, a part or all of the hardware configuration may exist on the network.

Second Embodiment

A positioning system according to a second embodiment of the present technology will be described.

[Configuration of Positioning System]

Figure 9:
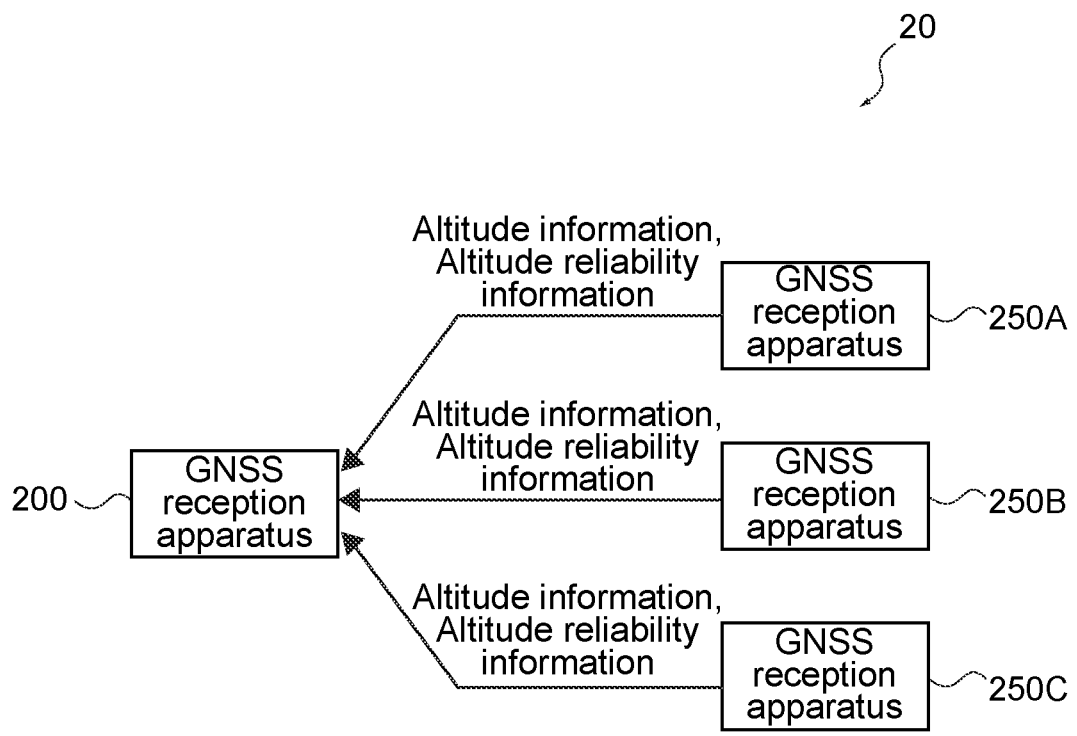
FIG. 9 is a schematic diagram of a positioning system according to a second embodiment of the present technology.

FIG. 9 is a schematic diagram showing a configuration of a positioning system 20 according to this embodiment. As shown in the figure, the positioning system 20 includes a plurality of GNSS reception apparatuses. The GNSS reception apparatus is an apparatus capable of receiving global navigation satellite system (GNSS) signals and performing positioning based on the GNSS signals.

In this embodiment, the positioning system 20 is assumed to include four GNSS reception apparatuses, but the number of GNSS reception apparatuses is not limited to four and it may be two or more.

As shown in FIG. 9, in the positioning system 20, one GNSS reception apparatus is a GNSS reception apparatus 200, and the other GNSS reception apparatuses are a GNSS reception apparatus 250A, a GNSS reception apparatus 250B, and a GNSS reception apparatus 250C. In addition, the GNSS reception apparatus 250A, the GNSS reception apparatus 250B, and the GNSS reception apparatus 250C are collectively referred to as GNSS reception apparatuses 250A to 250C.

Each GNSS reception apparatus is not particularly limited as long as it is an apparatus capable of GNSS positioning, but a wearable information processing apparatus is suitable.

The GNSS reception apparatuses are capable of communicating with each other via proximity wireless communication such as Bluetooth (registered trademark), and the GNSS reception apparatus 200 acquires pieces of altitude information from the GNSS reception apparatuses 250A to 250C. This will be described in detail later.

[Configuration of other GNSS Reception Apparatuses]

First, the configuration of the GNSS reception apparatus 250 to be used as the GNSS reception apparatuses 250A to 250C will be described. Note that in the configuration of the GNSS reception apparatus 250, the same structural elements as those of the GNSS reception apparatus 150 according to the first embodiment will be denoted by the same reference numerals as those of the first embodiment, and descriptions thereof will be omitted.

Figure 10:
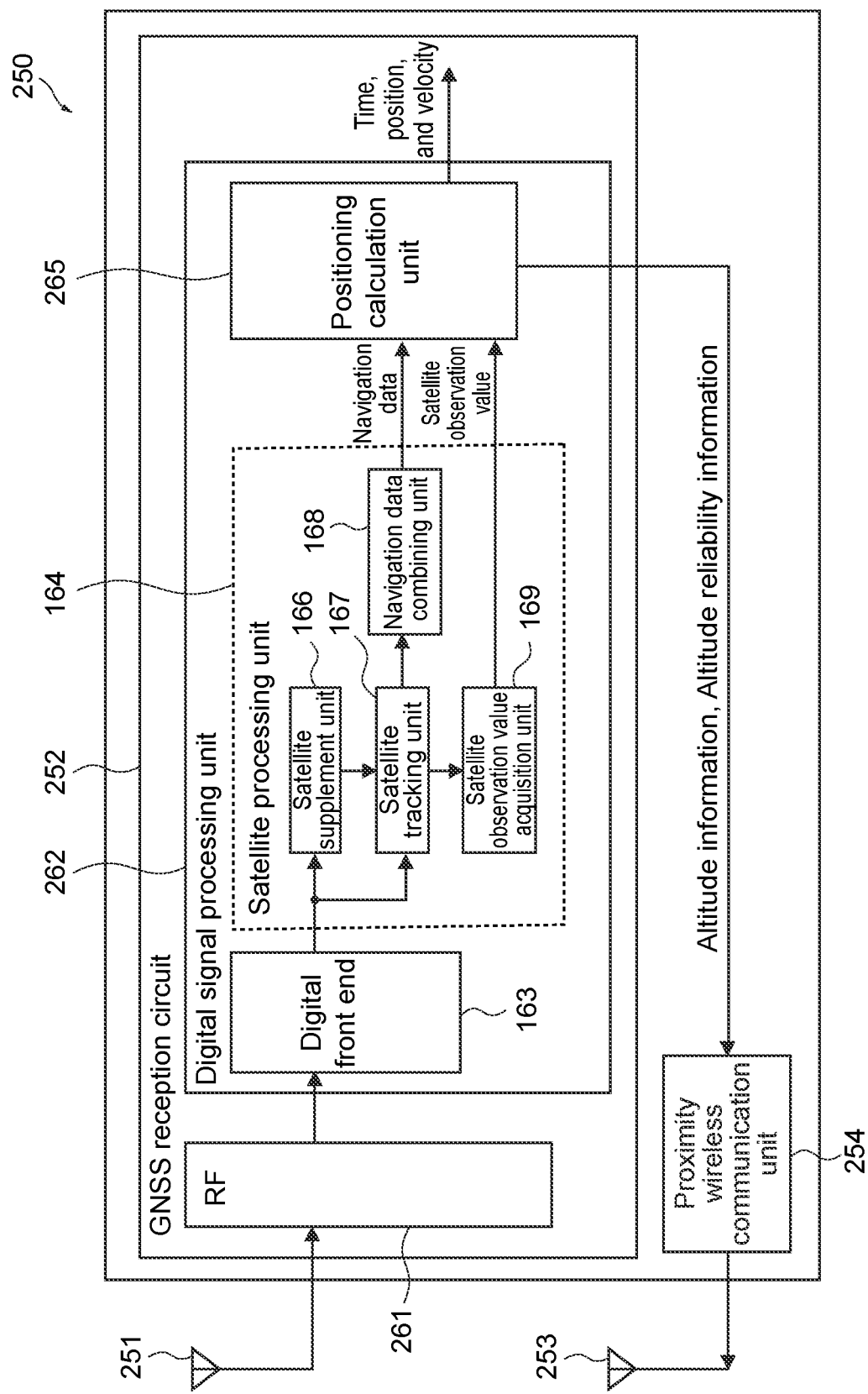
FIG. 10 is a block diagram showing a configuration of another GNSS reception apparatus of the positioning system.

FIG. 10 is a block diagram showing the configuration of the GNSS reception apparatus 250. As shown in the figure, the GNSS reception apparatus 250 includes a GNSS antenna 251, a GNSS reception circuit 252, a proximity wireless antenna 253, and a proximity wireless communication unit 254.

The GNSS antenna 251 is an antenna for receiving a GNSS signal and only needs to have a configuration capable of receiving the GNSS signal.

The GNSS reception circuit 252 is a circuit for processing the GNSS signal received by the GNSS antenna 251. The GNSS reception circuit 252 includes a radio frequency (RF) unit 261 and a digital signal processing unit 262.

The RF unit 261 converts the GNSS signal into an intermediate frequency (IF) signal and further into a digital signal and supplies the digital signal to the digital signal processing unit 262.

The digital signal processing unit 262 includes a digital front end 163, a satellite processing unit 164, and a positioning calculation unit 265. Of the structural elements of the digital signal processing unit 262, the structural elements other than the positioning calculation unit 265 are the same as those of the first embodiment.

The positioning calculation unit 265 performs positioning calculation from the navigation data and the satellite observation value and calculates the time, position, and velocity of the GNSS reception apparatus 250. This positioning calculation can be performed by a general calculation method. The positioning calculation unit 265 supplies "altitude information" indicating the altitude of the GNSS reception apparatus 250 to the proximity wireless communication unit 254.

Further, the positioning calculation unit 265 supplies "altitude reliability information" indicating the reliability of the altitude information to the proximity wireless communication unit 254. Details of the altitude reliability information will be described later.

The proximity wireless antenna 253 is an antenna capable of communicating with the GNSS reception apparatus 200 via proximity wireless communication. The type of the proximity wireless communication may be, for example, Bluetooth (registered trademark), but it is not particularly limited as long as it is capable of communicating with the GNSS reception apparatus 200.

The proximity wireless communication unit 254 transmits the altitude information and the altitude reliability information supplied from the positioning calculation unit 265 to the GNSS reception apparatus 200 via the proximity wireless antenna 253.

Each of the GNSS reception apparatuses 250A to 250C has the above-mentioned configuration and transmits the altitude information indicating the altitude thereof to the GNSS reception apparatus 200.

[Regarding Positioning Calculation Unit]

Figure 11:
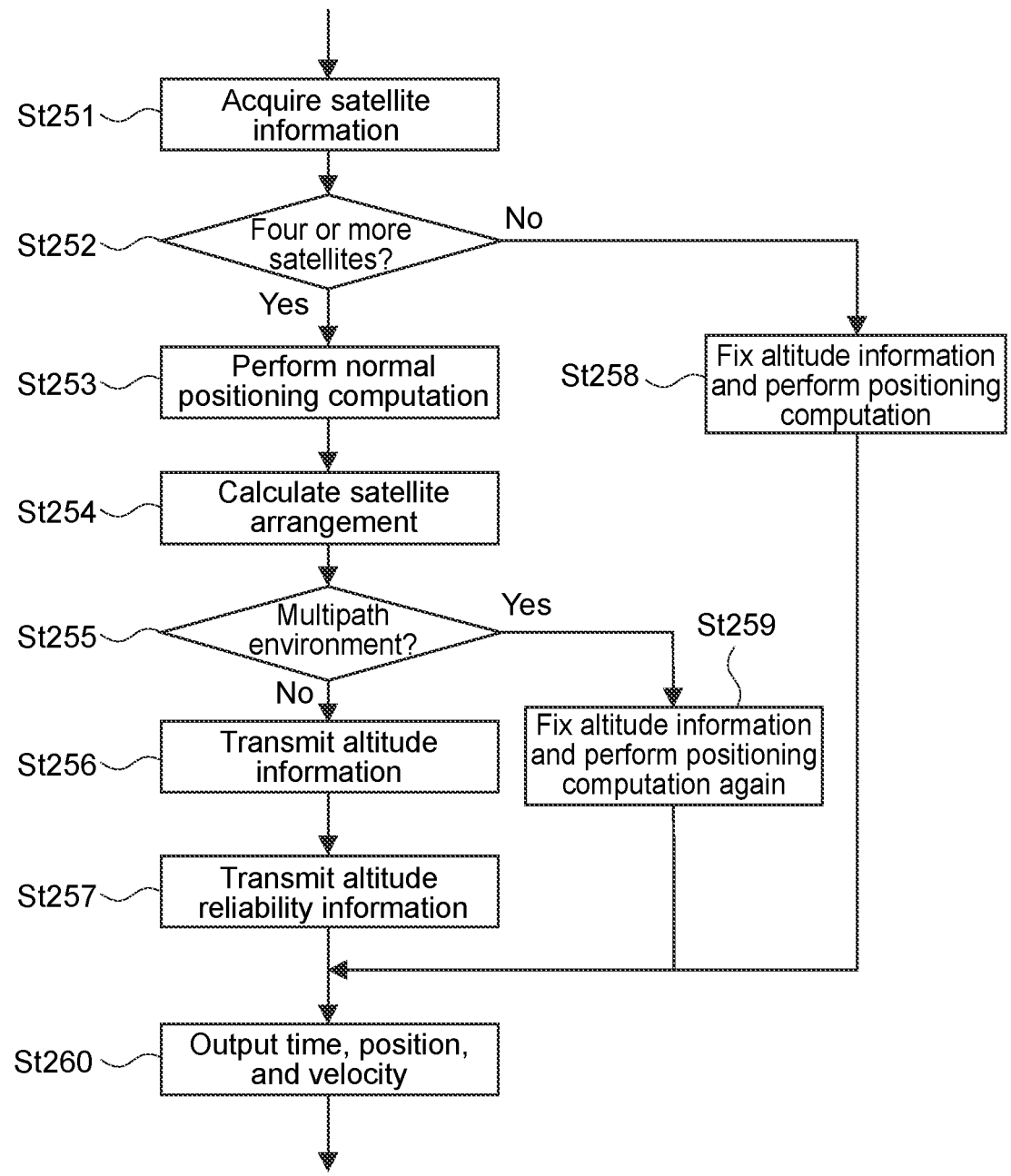
FIG. 11 is a flowchart showing the operation of a positioning calculation unit of the GNSS reception apparatus.

The positioning calculation unit 265 performs positioning calculation on the basis of the GNSS signal received by the GNSS antenna 251. FIG. 11 is a flowchart showing the operation of the positioning calculation unit 265.

The positioning calculation unit 265 acquires satellite information (St251) and then determines whether GNSS satellites that have received the GNSS signal are four or more satellites (St252). The satellite information includes reception satellites, pseudoranges, Doppler frequencies, carrier phases, signal intensities, etc.

If GNSS satellites that have received the GNSS signal are four or more satellites (St252: Yes), the positioning calculation unit 265 performs positioning computation by a normal method (St253) and calculates the position (including the altitude), time, and velocity of the GNSS reception apparatus 250. Subsequently, the positioning calculation unit 265 calculates a satellite arrangement (St254).

Further, the positioning calculation unit 265 determines whether the GNSS reception apparatus 250 is in a multipath environment or not (St255). The multipath environment is an environment in which the GNSS signal is reflected from buildings, mountains, etc., and reaches the GNSS antenna 151 by a plurality of paths.

If the GNSS reception apparatus 250 is not in the multipath environment (St255: No), the positioning calculation unit 265 supplies the altitude information indicating the altitude of the GNSS reception apparatus 250 to the proximity wireless communication unit 254, and the proximity wireless communication unit 254 transmits the altitude information to the GNSS reception apparatus 200 via the proximity wireless antenna 253 (St256).

Subsequently, the positioning calculation unit 265 supplies the altitude reliability information to the proximity wireless communication unit 254, and the proximity wireless communication unit 254 transmits the altitude reliability information to the GNSS reception apparatus 200 via the proximity wireless antenna 253 (St257).

The altitude reliability information is information indicating the degree of reliability of the altitude calculated by the positioning calculation unit 265. The positioning calculation unit 265 may use the satellite arrangement calculated in the above-mentioned step (St254) as the altitude reliability information. For example, DOP (Dilution Of Precision) can be used as the satellite arrangement, and when the height index VDOP (Vertical DOP) is equal to or less than a predetermined value, it can be determined that the satellite arrangement is highly reliable. In addition, the positioning calculation unit 265 can also use signal level information of the GNSS satellite used for positioning as the altitude reliability information. The signal level information is information that can be obtained from the signal power and noise power of the GNSS signal and indicates the reception sensitivity of the GNSS signal.

In addition, the positioning calculation unit 265 may transmit both the satellite arrangement and the signal level information as the altitude reliability information to the GNSS reception apparatus 200.

On the other hand, if GNSS satellites that have received the GNSS signal are three or less satellites (St252: No), the number of GNSS satellites is insufficient to calculate the altitude information of the GNSS reception apparatus 250, and thus the positioning calculation unit 265 performs positioning computation by fixing the altitude information (St258).

In addition, if the GNSS reception apparatus 250 is in the multipath environment (St255: Yes), the positioning calculation unit 265 performs positioning computation again by fixing the altitude information (St259).

The positioning calculation unit 265 outputs the calculated time, position, and velocity of the GNSS reception apparatus 150 (St260). The positioning calculation unit 265 performs the operation as described above.

As described above, in a case where a reception environment of the GNSS signal is good, that is, in a case where the number of satellites that have received the GNSS signal is four or more, or where the GNSS reception apparatus 250 is not in the multipath environment, the GNSS reception apparatus 250 transmits its own altitude information and altitude reliability information calculated by the positioning computation to the GNSS reception apparatus 200.

[Configuration of GNSS Reception Apparatus]

Next, a configuration of the GNSS reception apparatus 200 will be described.

Figure 12:
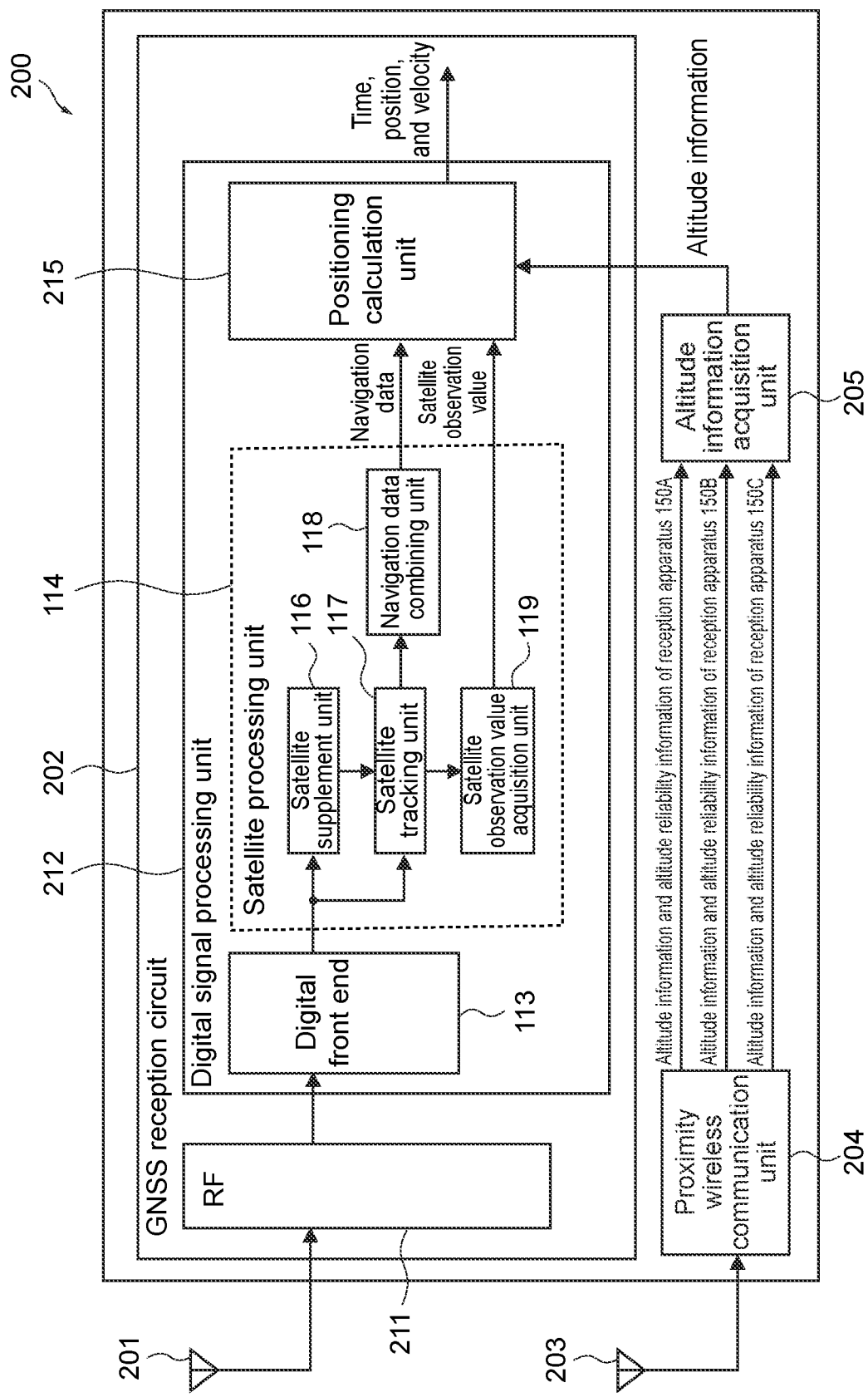
FIG. 12 is a block diagram showing a configuration of a GNSS reception apparatus of the positioning system according to the second embodiment of the present technology.

FIG. 12 is a schematic diagram showing the configuration of the GNSS reception apparatus 200. As shown in the figure, the GNSS reception apparatus 200 includes a GNSS antenna 201, a GNSS reception circuit 202, a proximity wireless antenna 203, a proximity wireless communication unit 204, and an altitude information acquisition unit 205. Note that in the configuration of the GNSS reception apparatus 200, the same structural elements as those of the GNSS reception apparatus 100 according to the first embodiment will be denoted by the same reference numerals as those of the first embodiment, and descriptions thereof will be omitted.

The GNSS antenna 201 is an antenna for receiving a GNSS signal and only needs to have a configuration capable of receiving the GNSS signal.

The GNSS reception circuit 202 is a circuit for processing the GNSS signal received by the GNSS antenna 201. The GNSS reception circuit 202 includes a radio frequency (RF) unit 211 and a digital signal processing unit 212.

The RF unit 211 converts the GNSS signal into an intermediate frequency (IF) signal and further into a digital signal and supplies the digital signal to the digital signal processing unit 212.

The digital signal processing unit 212 includes a digital front end 113, a satellite processing unit 114, and a positioning calculation unit 215. Of the structural elements of the digital signal processing unit 212, the structural elements other than the positioning calculation unit 215 are the same as those of the first embodiment.

The positioning calculation unit 215 performs positioning calculation from the navigation data and the satellite observation value. Here, the positioning calculation unit 115 according to this embodiment further uses pieces of altitude information acquired from the GNSS reception apparatuses 150A to 150C for the positioning calculation. This will be described in detail later.

The proximity wireless antenna 203 is an antenna capable of communicating with the GNSS reception apparatuses 250A to 250C via proximity wireless communication. The type of the proximity wireless communication may be, for example, Bluetooth (registered trademark), but it is not particularly limited as long as it is capable of communicating with the GNSS reception apparatuses 250A to 250C.

The proximity wireless communication unit 204 receives the pieces of altitude information and altitude reliability information from the respective GNSS reception apparatuses 250A to 250C via the proximity wireless antenna 203 and supplies them to the altitude information acquisition unit 205.

The altitude information acquisition unit 205 determines the altitude of the GNSS reception apparatus 200 from the pieces of altitude information and altitude reliability information of the respective GNSS reception apparatuses 250A to 250C and supplies the altitude information to the positioning calculation unit 215.

[Regarding Altitude Information Acquisition Unit]

Figure 13:
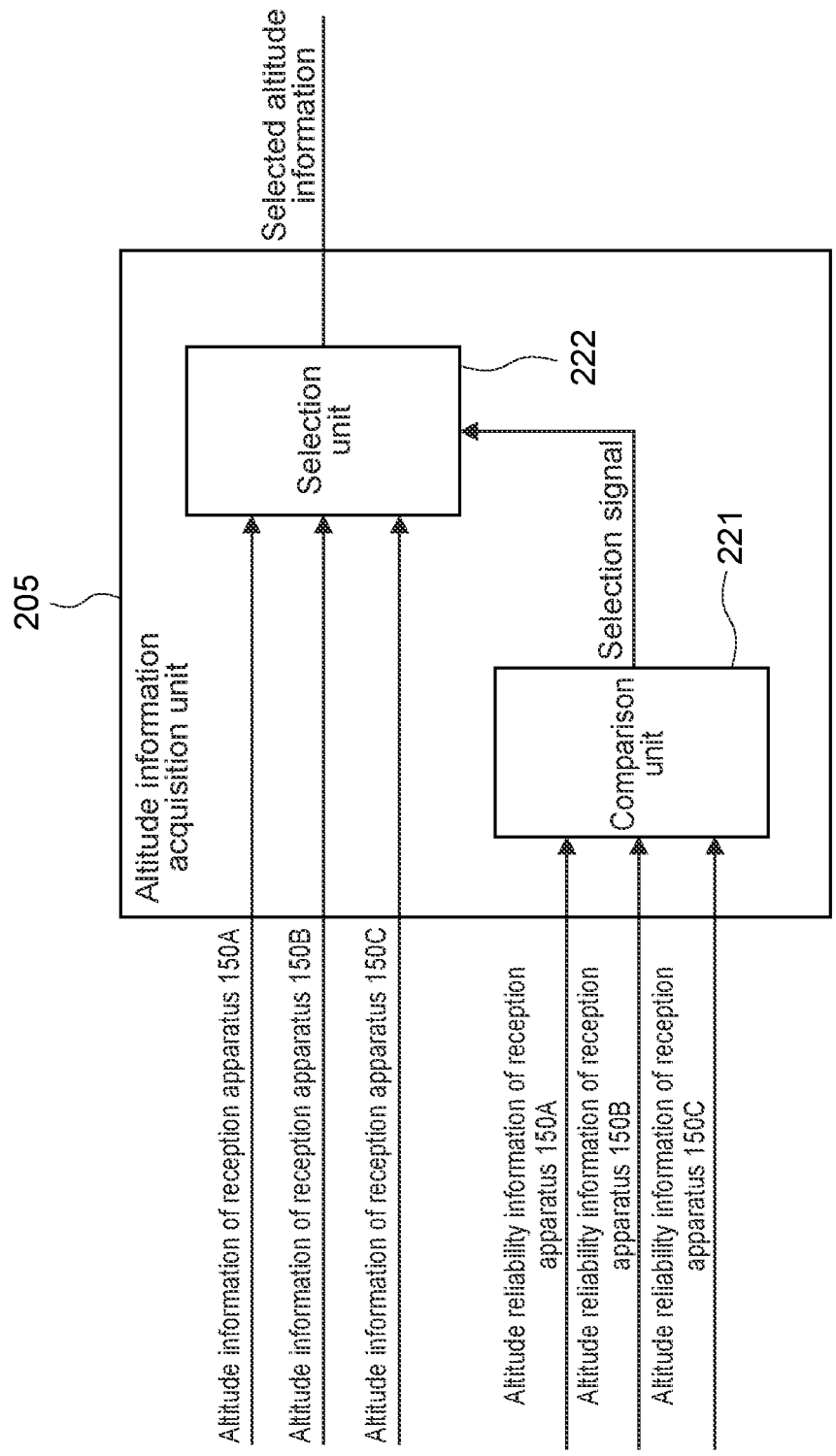
FIG. 13 is a block diagram showing a configuration of an altitude information acquisition unit of the GNSS reception apparatus.

FIG. 13 is a block diagram showing a configuration of the altitude information acquisition unit 205. As shown in the figure, the altitude information acquisition unit 205 includes a comparison unit 221 and a selection unit 222.

The comparison unit 221 compares the pieces of altitude reliability information acquired from the respective GNSS reception apparatuses 150A to 150C and selects a GNSS reception apparatus 150 having the highest altitude reliability among the GNSS reception apparatuses 150A to 150C. The comparison unit 221 supplies a selection signal indicating the selected GNSS reception apparatus 250 to the selection unit 222.

The selection unit 222 acquires the pieces of altitude information of the respective GNSS reception apparatuses 150A to 150C and selects the altitude information of the GNSS reception apparatus 150 indicated by the selection signal. The selection unit 222 supplies the selected altitude information to the positioning calculation unit 215.

Note that the case where the proximity wireless communication unit 204 receives the pieces of altitude information from the respective GNSS reception apparatuses 250A to 250C is shown here, but as described above, the pieces of altitude information may be received from part of the GNSS reception apparatuses 250A to 250C or may be received from a larger number of GNSS reception apparatuses 250. Also in these cases, the comparison unit 221 selects the GNSS reception apparatus 150 on the basis of on the received altitude reliability information, and the selection unit 222 supplies the altitude information of the selected GNSS reception apparatus 250 to the positioning calculation unit 215.

[Regarding Positioning Calculation Unit]

The positioning calculation unit 215 performs positioning calculation on the basis of the GNSS signal received by the GNSS antenna 201 and the altitude information supplied from the altitude information acquisition unit 205.

Figure 14:
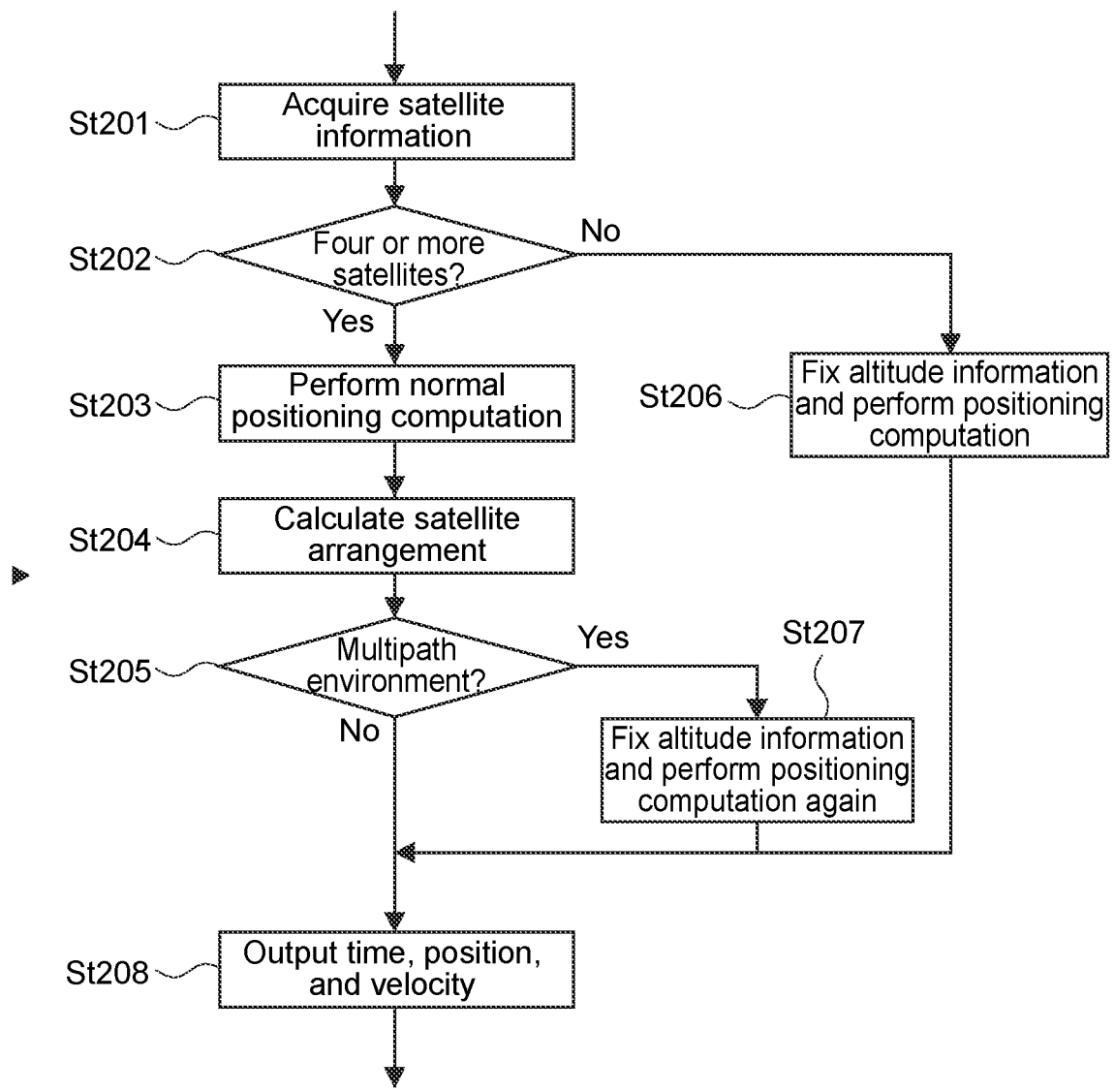
FIG. 14 is a flowchart showing the operation of a positioning calculation unit of the GNSS reception apparatus.

FIG. 14 is a flowchart showing the operation of the positioning calculation unit 215.

The positioning calculation unit 215 acquires satellite information (St201) and then determines whether GNSS satellites that have received the GNSS signal are four or more satellites (St202). The satellite information includes reception satellites, pseudoranges, Doppler frequencies, carrier phases, signal intensities, etc.

If GNSS satellites that have received the GNSS signal are four or more satellites (St202: Yes), the positioning calculation unit 215 performs positioning computation by a normal method (St203) and calculates the position, time, and velocity of the GNSS reception apparatus 250. Subsequently, the positioning calculation unit 215 calculates a satellite arrangement (St204).

Further, the positioning calculation unit 215 determines whether the GNSS reception apparatus 250 is in a multipath environment or not (St205).

If the GNSS reception apparatus 200 is not in the multipath environment (St205: No), the positioning calculation unit 215 sets the time, position, and velocity calculated in the positioning computation (St203) as the time, position, and velocity of the GNSS reception apparatus 200.

On the other hand, if GNSS satellites that have received the GNSS signal are three or less satellites (St202: No), the positioning calculation unit 215 performs positioning computation by fixing the altitude information supplied from the altitude information acquisition unit 205 as its own altitude information (St206).

In addition, if the GNSS reception apparatus 250 is in the multipath environment (St205: Yes), the positioning calculation unit 215 performs positioning computation again by fixing the altitude information supplied from the altitude information acquisition unit 205 as its own altitude information (St207).

The positioning calculation unit 215 outputs the calculated time, position, and velocity of the GNSS reception apparatus 200 (St208).

The positioning calculation unit 215 performs the operation as described above. In a case where a reception environment of the GNSS signal is good, that is, in a case where the number of satellites that have received the GNSS signal is four or more, or where the GNSS reception apparatus 100 is not in the multipath environment, the positioning calculation unit 215 calculates the time, the position, and the velocity on the basis of the GNSS signal.

On the other hand, in a case where the reception environment is not good, that is, in a case where the number of satellites that have received the GNSS signal is three or less, or where the GNSS reception apparatus 200 is in the multipath environment, the positioning calculation unit 215 calculates the time, the position, and the velocity on the basis of the altitude information supplied by the altitude information acquisition unit 205 in addition to the received GNSS signal.

As in the first embodiment, in a case where the reception environment of the GNSS signal is not good, the positioning calculation unit 215 calculates its own time, position, and velocity using the altitude information of the GNSS reception apparatus 250 located in the neighborhood. At this time, the altitude information used by the positioning calculation unit 215 is the altitude information of the GNSS reception apparatus 250 selected on the basis of the altitude reliability information, and is the altitude information having the highest reliability. As a result, even in a case where the reception environment of the GNSS signal is not good, the GNSS reception apparatus 200 is capable of calculating its own time, position and velocity with high accuracy.

Note that the GNSS reception apparatus 250 may have the same configuration as that of the GNSS reception apparatus 200, i.e., each of them may have the altitude information acquisition unit.

[Regarding Hardware Configuration]

At least a part of the functional configuration of the GNSS reception apparatus 200 can also be provided by cooperation of hardware and programs. The hardware configuration may be similar to that of the first embodiment.

For example, the GNSS reception circuit 202 and the proximity wireless communication unit 204 described above may be provided by modules independent of the CPU 1001 and may be connected to the input/output unit 1005 (see FIG. 8). In addition, the positioning calculation unit 215 and the altitude information acquisition unit 205 may be provided by cooperation of the CPU 1001 and programs.

Note that the present technology may take the following configurations.

(1) A reception apparatus, including:
an altitude information acquisition unit that acquires altitude information externally calculated via proximity wireless communication; and
a positioning calculation unit that performs positioning computation on the basis of a received global navigation satellite system (GNSS) signal and the altitude information supplied from the altitude information acquisition unit.

(2) The reception apparatus according to (1), in which
the altitude information acquisition unit acquires, from another reception apparatus having a GNSS positioning function and a proximity wireless communication function, altitude information calculated in the other reception apparatus.

(3) The reception apparatus according to (1) or (2), in which
the altitude information acquisition unit acquires, from a plurality of other reception apparatuses, pieces of altitude information calculated in the plurality of other reception apparatuses.

(4) The reception apparatus according to (3), in which
the altitude information acquisition unit supplies a median value of altitudes calculated in the plurality of other reception apparatuses to the positioning calculation unit.

(5) The reception apparatus according to (3), in which
the altitude information acquisition unit supplies a mean value of altitudes calculated in the plurality of other reception apparatuses to the positioning calculation unit.

(6) The reception apparatus according to any one of (1) to (5), in which
the altitude information acquisition unit further acquires altitude reliability information indicating reliability of an altitude via the proximity wireless communication and selects the altitude information to be supplied to the positioning calculation unit on the basis of the altitude reliability information.

(7) The reception apparatus according to (6), in which the altitude reliability information is information indicating a satellite signal arrangement.

(8) The reception apparatus according to (6), in which the altitude reliability information is information indicating a GNSS signal level determined from signal power and noise power of the GNSS signal.

(9) The reception apparatus according to any one of (1) to (8), in which
the positioning calculation unit performs, when satellites that have received the GNSS signal are four or more, positioning computation on the basis of the received GNSS signal and performs, when the satellites that have received the GNSS signal are three or less, positioning computation on the basis of the received GNSS signal and the altitude information supplied from the altitude information acquisition unit.

(10) The reception apparatus according to any one of (1) to (8), in which
the positioning calculation unit performs, when the reception apparatus is not in a multipath environment, positioning computation on the basis of the received GNSS signal and performs, when the reception apparatus is in the multipath environment, positioning computation on the basis of the received GNSS signal and the altitude information supplied from the altitude information acquisition unit.

(11) A program that causes an information processing apparatus to function as:
an altitude information acquisition unit that acquires altitude information externally calculated via proximity wireless communication; and
a positioning calculation unit that performs positioning computation on the basis of a received global navigation satellite system (GNSS) signal and the altitude information supplied from the altitude information acquisition unit.

(12) A reception method, including:
acquiring, by an altitude information acquisition unit, altitude information externally calculated via proximity wireless communication; and
performing, by a positioning calculation unit, positioning computation on the basis of a received global navigation satellite system (GNSS) signal and the altitude information supplied from the altitude information acquisition unit.

REFERENCE SIGNS LIST 10, 20 positioning system
100, 200 GNSS reception apparatus
101, 201 GNSS antenna
102, 202 GNSS reception circuit
103, 203 proximity wireless antenna
104, 204 proximity wireless communication unit
105, 205 altitude information acquisition unit
115, 215 positioning calculation unit
121 sorting unit
122 median value selection unit
123 mean value calculation unit
221 comparison unit
222 selection unit

The invention claimed is:
1. A first reception apparatus, comprising:
a positioning calculation unit; and
an altitude information acquisition unit configured to:
acquire, from a plurality of reception apparatuses via proximity wireless communication, a plurality of pieces of altitude information calculated in the plurality of reception apparatuses, wherein
the plurality of reception apparatuses excludes the first reception apparatus, and
each of the plurality of pieces of altitude information indicates an altitude of a corresponding reception apparatus of the plurality of reception apparatuses;
acquire a plurality of pieces of altitude reliability information from the plurality of reception apparatuses via the proximity wireless communication,
wherein each of the plurality of pieces of altitude reliability information indicates a reliability of the altitude of the corresponding reception apparatus of the plurality of reception apparatuses;
select, based on the plurality of pieces of altitude reliability information, a second reception apparatus of the plurality of reception apparatuses having a highest reliability of the altitude among the plurality of reception apparatuses; and
supply a piece of altitude information of the plurality of pieces of altitude information of the selected second reception apparatus to the positioning calculation unit,
wherein the positioning calculation unit is configured to:
compute, in a case where four or more global navigation satellite system (GNSS) signals have been received, positioning based on the GNSS signals; and
compute, in a case where three or less of the GNSS signals have been received, the positioning based on the GNSS signals and the piece of altitude information of the selected second reception apparatus supplied from the altitude information acquisition unit.

2. The first reception apparatus according to claim 1, wherein each of the plurality of reception apparatuses has a GNSS positioning function and a proximity wireless communication function.

3. The first reception apparatus according to claim 1, wherein each of the plurality of pieces of altitude reliability information includes information indicating a satellite signal arrangement.

4. The first reception apparatus according to claim 1, wherein each of the plurality of pieces of altitude reliability information includes information indicating a GNSS signal level determined from signal power and noise power of the GNSS signals.

5. The first reception apparatus according to claim 1, wherein the positioning calculation unit is further configured to:
compute, in a case where the first reception apparatus is not in a multipath environment, the positioning based on the GNSS signals; and
compute, in a case where the first reception apparatus is in the multipath environment, the positioning based on the GNSS signals and the piece of altitude information supplied from the altitude information acquisition unit.

6. A non-transitory computer-readable medium having stored thereon, computer-executable instructions, which when executed by a processor of a first reception apparatus, cause the processor to execute operations, the operations comprising:
acquiring, from a plurality of reception apparatuses via proximity wireless communication, a plurality of pieces of altitude information calculated in the plurality of reception apparatuses, wherein
the plurality of reception apparatuses excludes the first reception apparatus, and
each of the plurality of pieces of altitude information indicates an altitude of a corresponding reception apparatus of the plurality of reception apparatuses;
acquiring a plurality of pieces of altitude reliability information from the plurality of reception apparatuses via the proximity wireless communication,
wherein each of the plurality of pieces of altitude reliability information indicates a reliability of the altitude of the corresponding reception apparatus of the plurality of reception apparatuses;
selecting, based on the plurality of pieces of altitude reliability information, a second reception apparatus of the plurality of reception apparatuses having a highest reliability of the altitude among the plurality of reception apparatuses;
computing, in a case where four or more global navigation satellite system (GNSS) signals have been received, positioning based on the GNSS signals; and
computing, in a case where three or less of the GNSS signals have been received, the positioning based on the GNSS signals and a piece of altitude information of the plurality of pieces of altitude information of the selected second reception apparatus.

7. A reception method, comprising:
acquiring, by an altitude information acquisition unit of a first reception apparatus, a plurality of pieces of altitude information from a plurality of reception apparatuses via proximity wireless communication, wherein
the plurality of reception apparatuses excludes the first reception apparatus, and
each of the plurality of pieces of altitude information indicates an altitude of a corresponding reception apparatus of the plurality of reception apparatuses;
acquiring, by the altitude information acquisition unit, a plurality of pieces of altitude reliability information from the plurality of reception apparatuses via the proximity wireless communication,
wherein each of the plurality of pieces of altitude reliability information indicates a reliability of the altitude of the corresponding reception apparatus of the plurality of reception apparatuses;
selecting, by the altitude information acquisition unit, based on the plurality of pieces of altitude reliability information, a second reception apparatus of the plurality of reception apparatuses having a highest reliability of the altitude among the plurality of reception apparatuses;
in a case where four or more global navigation satellite system (GNSS) signals have been received, computing, by a positioning calculation unit of the first reception apparatus, positioning based on the GNSS signals; and
in a case where three or less of the GNSS signals have been received, computing, by the positioning calculation unit, the positioning based on the GNSS signals and a piece of altitude information of the plurality of pieces of altitude information of the selected second reception apparatus.

\* \* \* \* \*